Figure 1:
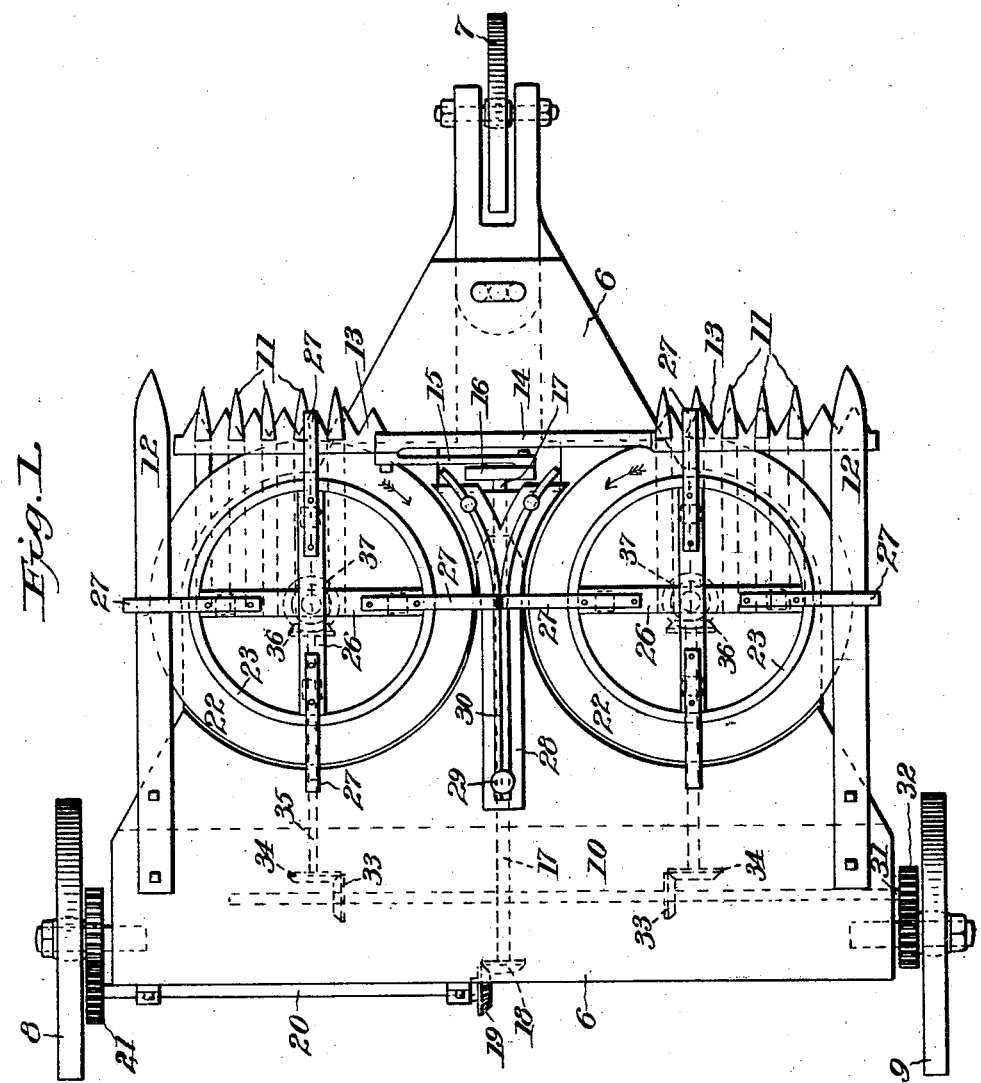

No. 763,424. PATENTED JUNE 28, 1904.
W. V. PHILLIPS.
CORN HARVESTER.
APPLICATION FILED FEB. 17, 1904.
NO MODEL. 2 SHEETS—SHEET 1.

Witnesses
C. N. Walker,
Geo. E. Tew

Inventor
William V. Phillips
By
Mio B. Stevens & Co.
Attorneys

No. 763,424. PATENTED JUNE 28, 1904.
W. V. PHILLIPS.
CORN HARVESTER.
APPLICATION FILED FEB. 17, 1904.
NO MODEL. 2 SHEETS—SHEET 2.
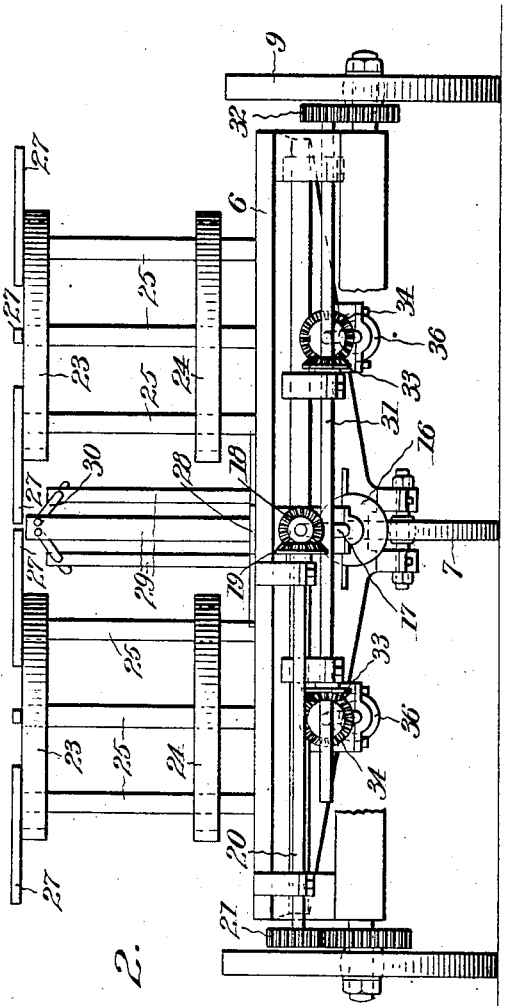
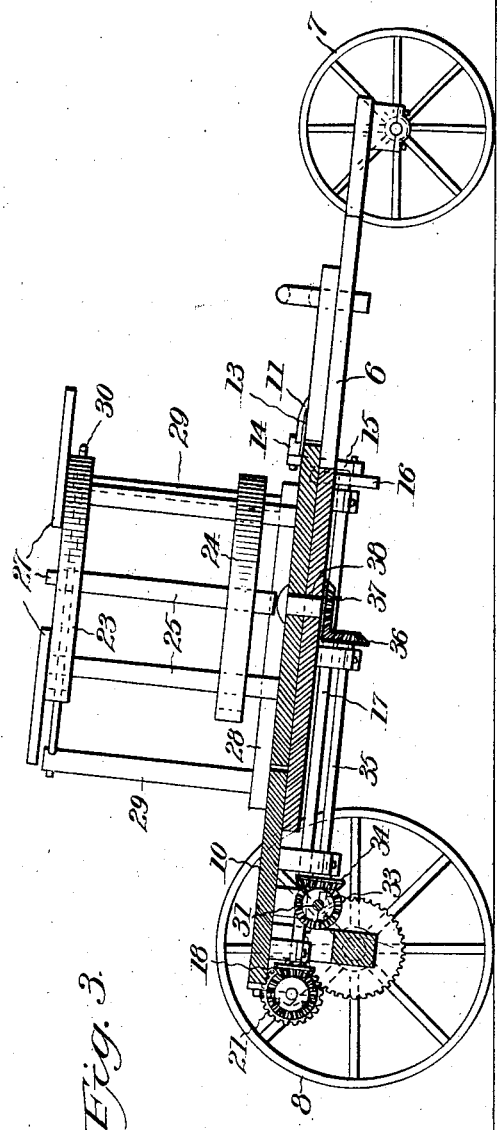

No. 763,424.

Patented June 28, 1904.

UNITED STATES PATENT OFFICE.

WILLIAM VIRGEL PHILLIPS, OF WRIGHT CITY, MISSOURI.

CORN-HARVESTER.

SPECIFICATION forming part of Letters Patent No. 763,424, dated June 28, 1904.

Application filed February 17, 1904. Serial No. 194,042. (No model.)

*To all whom it may concern:*

Be it known that I, WILLIAM VIRGEL PHILLIPS, a citizen of the United States, residing at Wright City, in the county of Warren and State of Missouri, have invented new and useful Improvements in Corn-Harvesters, of which the following is a specification.

This invention relates particularly to that class of corn-harvesters which cut standing corn and carry the same to a platform in position to be taken by an operator and tied into shocks or bundles.

The object of the invention is to produce an improved harvester of this kind characterized particularly by the fact that it will cut two rows at a time, having a pair of oppositely-rotating carriers, upon which the stalks are deposited as fast as they are cut, and these carriers deliver the stalks to the rear to a platform where the operator stands.

Other improvement is claimed with respect to the general and particular construction of the machine, as will more fully hereinafter appear.

In the accompanying drawings, Figure 1 is a plan view of the machine. Fig. 2 is a rear elevation. Fig. 3 is a side elevation, partly in section.

Speaking generally, the machine comprises a triangular-shaped frame adapted to be drawn point foremost between two rows of standing corn and having cutters at each side. Behind each cutter is a rotating carrier which works toward the middle and upon which the stalks are delivered standing. These carriers have arms and guides which hold the corn in standing position and carry the same toward the middle and thence backwardly to the operator's platform, so that the stalks from both rows are delivered substantially together to the operator.

Referring specifically to the drawings, a triangular-shaped frame is indicated at 6, supported at the front upon a single wheel 7 and at the rear corners upon wheels 8 and 9. Extending across the rear of the frame is an operator's platform 10. At each side of the frame are a series of guards 11, to which the stalks are directed by the adjacent side of the triangular frame and by gatherers 12 on the outside. Cutters 13 reciprocate in these guards and are connected to a single connecting-rod 14, which is driven by a pitman 15, connected to the connecting-rod and to a crank-wheel 16. This crank-wheel is at the front end of a shaft 17, which is mounted in suitable bearings in the frame of the machine under the platform, and the rear end of the shaft carries a bevel-pinion 18, in mesh with a pinion 19 on a shaft 20, which extends crosswise at the rear of the machine and carries at its outer end a gear-wheel 21, which meshes with a gear on the hub of the wheel 8. The cutters are thus driven.

Directly behind each cutter is a carrier, which are similar in all respects, except that they revolve in opposite directions, or toward each other at the front. Each carrier consists of a circular rotating table or platform 22, upon which is mounted a reel comprising upper and lower rings 23 and 24, respectively, said rings being carried by standards 25, erected on the rotating table and supporting the rings by means of diametrical cross-bars 26. Each reel carries a plurality of arms 27, which are supported on the standards and cross-bars and project radially beyond the rings.

Between the wheels is a pair of guides to hold the stalks upon the rotating tables and against the reels. The guides preferably consist of a curved piece 28, which is supported upon the frame in position above the edges of the tables, and mounted upon this piece are standards 29, which support curved rods 30, opposite the top rings, directly under the arms 27. The lower curved pieces guide the butts of the stalks, and the rods guide the tops thereof.

The cutters 13 work directly above the front outer edge of the rotating tables, and said tables are substantially flush with the operator's platform 10. When the stalks are cut by the cutters, they drop back onto the rotating tables, where they are caught by the arms 27 and carried inwardly and backwardly between the rings and the guides 28 and 30 to the platform, where the stalks from both cutters are delivered substantially together in position to be taken by the operator and tied into shocks.

The tables are driven by the wheel 9 through intermediate transmitting devices, which consist of a shaft 31, extending across the rear of the machine and having a pinion 32 in mesh with the gear on the hub of the wheel 9. The shaft 31 has a bevel-gear 33 for each table, and said bevel-gear is in mesh with a bevel-gear 34 on a shaft 35, which carries a gear 36 in mesh with a gear 37 on the spindle 38, which projects downwardly from each table.

It will be seen from the above description that one wheel, 8, drives the cutting mechanism, and the other wheel, 9, drives the carriers. The triangular shape of the frame and the disposition of the cutters on both sides enable the frame to be drawn between two rows of corn, which are both cut by the cutters, and the inclined sides, due to the triangular shape, act as very efficient guides to direct the cornstalks to the cutters. The wide platform at the back gives space for one or more men to work as may be necessary, and the three-wheel construction gives a steadier machine less liable to rock and shake than if four wheels were employed. The double construction of the carriers delivering the stalks substantially together enables one operator to handle the stuff from two rows, whereby the capacity of the machine is increased in proportion to the labor employed.

What I claim as new, and desire to secure by Letters Patent, is—

1. In combination, a wheeled frame having a cutter on each side, a pair of rotating tables and reels behind the cutters, the front portion of which tables turn toward each other to bunch the stalks from both cutters together, and guides beside the reels, constructed to hold the stalks in standing position.

2. In combination, a wheeled frame having a tapered front end, a cutter projecting beyond each side of the frame, a binding-platform at the rear of the frame, and movable carrying-tables on the frame between the cutters and the platform, the front edges of which travel from the cutters toward each other and to the platform.

3. In combination, a wheeled frame, a cutter near the front thereof and a platform near the rear thereof, a rotary table the front edge of which travels just behind the cutter, to receive stalks therefrom, and the rear edge of which is adjacent the platform, to deliver stalks thereto, a reel on the table and rotatable therewith, and guides on the frame, extending beside the reel, from the cutter to the platform.

4. In combination, a wheeled frame, a cutter at each side thereof, a rotating table and reel behind each cutter and constructed to take and carry stalks therefrom, the direction of rotation of said tables and reels being toward each other at the front, and converging guides extending beside and between the reels, from the cutters to the rear of the frame.

In testimony whereof I have signed my name to this specification in the presence of two subscribing witnesses.

WILLIAM VIRGEL PHILLIPS.

Witnesses:
   H. H. ORDELHEIDE,
   J. W. ORDELHEIDE.